United States Patent
Shan et al.

(10) Patent No.: US 10,752,087 B2
(45) Date of Patent: Aug. 25, 2020

(54) VEHICLE REFRIGERATION SYSTEM INCLUDING CABIN AND OUTDOOR CONDENSER CIRCUITS WITH A HOLDING RESERVOIR AND A BYPASS CONTROLLED OUTSIDE SUBCOOL HEAT EXCHANGER FOR HEATING OUTPUT CONTROL OF CONDENSERS

(71) Applicants: DENSO International America, Inc., Southfield, MI (US); DENSO CORPORATION, Kariya, Aichi-pref. (JP)

(72) Inventors: Zhiwei Shan, Rochester, MI (US); Mikiharu Kuwahara, Southfield, MI (US)

(73) Assignees: DENSO International America, Inc., Southfield, MI (US); DENSO CORPORATION, Kariya, Aichi-Pref. (JP)

( * ) Notice: Subject to any disclaimer, the term of this patent is extended or adjusted under 35 U.S.C. 154(b) by 78 days.

(21) Appl. No.: 16/181,567

(22) Filed: Nov. 6, 2018

(65) Prior Publication Data
US 2019/0210426 A1   Jul. 11, 2019

Related U.S. Application Data

(60) Provisional application No. 62/615,503, filed on Jan. 10, 2018.

(51) Int. Cl.
*B60H 1/00* (2006.01)
*B60H 1/22* (2006.01)

(52) U.S. Cl.
CPC ..... *B60H 1/00899* (2013.01); *B60H 1/00278* (2013.01); *B60H 1/00392* (2013.01);
(Continued)

(58) Field of Classification Search
CPC ............ B60H 1/00899; B60H 1/00278; B60H 1/00392; B60H 1/00792; B60H 1/00885;
(Continued)

(56) References Cited

U.S. PATENT DOCUMENTS 10,000,109 B2 *  6/2018  Gilley ................ B60H 1/00778
10,071,614 B2 *  9/2018  Kuroda ............. B60H 1/32284
(Continued)

*Primary Examiner* — Davis D Hwu
(74) *Attorney, Agent, or Firm* — Harness, Dickey & Pierce, P.L.C.

(57) ABSTRACT

A refrigeration system for a vehicle is provided and includes inside and outside condenser circuits. The inside condenser circuit includes a first valve receiving a first portion of refrigerant out of a compressor, and a cabin condenser receiving and condensing the first portion from the first valve while heating an interior of a cabin. The outside condenser circuit includes: a second valve receiving a second portion of the refrigerant out of the compressor; an outside condenser receiving and compressing the second portion from the second valve; a reservoir downstream from the cabin condenser and the outside condenser receiving the first and second portions; a heat exchanger downstream from the reservoir; and a bypass valve connected in parallel with the heat exchanger. The heat exchanger and the bypass valve receive portions of the refrigerant from the reservoir. A control module controls positions of the first, second and bypass valves.

9 Claims, 6 Drawing Sheets

(52) U.S. Cl.
CPC ..... B60H 1/00792 (2013.01); B60H 1/00885 (2013.01); B60H 1/00921 (2013.01); B60H 1/22 (2013.01); *B60H 2001/00307* (2013.01); *B60H 2001/00614* (2013.01); *B60H 2001/00928* (2013.01); *B60H 2001/00949* (2013.01); *B60H 2001/224* (2013.01); *B60H 2001/2246* (2013.01); *B60H 2001/2287* (2013.01)

(58) Field of Classification Search
CPC .................. B60H 1/00921; B60H 1/22; B60H 2001/00307; B60H 2001/00614; B60H 2001/00928; B60H 2001/00949; B60H 2001/224; B60H 2001/2246; B60H 2001/2287
USPC ........................................................ 165/202
See application file for complete search history.

(56) References Cited

U.S. PATENT DOCUMENTS

| | | | |
|---|---|---|---|
| 10,486,493 B2* | 11/2019 | Kim | B60H 1/00278 |
| 2016/0137032 A1* | 5/2016 | Kuroda | B60H 1/00899 |
| | | | 165/104.32 |
| 2016/0159203 A1* | 6/2016 | Kuroda | B60H 1/32284 |
| | | | 62/160 |

* cited by examiner

VEHICLE REFRIGERATION SYSTEM INCLUDING CABIN AND OUTDOOR CONDENSER CIRCUITS WITH A HOLDING RESERVOIR AND A BYPASS CONTROLLED OUTSIDE SUBCOOL HEAT EXCHANGER FOR HEATING OUTPUT CONTROL OF CONDENSERS

CROSS-REFERENCE TO RELATED APPLICATIONS

This application claims the benefit of U.S. Provisional Application No. 62/615,503, filed on Jan. 10, 2018. The entire disclosure of the above application is incorporated herein by reference.

FIELD

The present disclosure relates to vehicle refrigeration systems, and more particularly to controlling heat output of corresponding condensers.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

For electric vehicles, refrigeration systems (especially heat pump systems) need to provide cabin climate control and powertrain cooling (e.g., cooling of a battery pack, power electronics and/or other electronic components). In the winter (or during cold temperature conditions), a cabin condenser can be required to condense refrigerant at least at 40° C. in order to supply warm enough air for cabin heating. If refrigerant is at a temperature less than 40° C., then the cabin condenser may not output enough heat to satisfy cabin heating requests. If, while the cabin condenser is being used to supply warm air, there is a need to use an outside condenser for powertrain cooling purposes, almost all heating capacity of the refrigeration system is provided at the outside condenser. This is because the outside condenser is much bigger than the cabin condenser. Also, rate of air flow through the outside condenser is much higher than a rate of air flow through the cabin condenser. As a result, the refrigeration system is unable to provide cabin comfort (i.e., adjust an air temperature in the cabin to a set temperature while providing power train cooling.

SUMMARY

A refrigeration system for a vehicle is provided. The refrigeration system includes an inside condenser circuit, an outside condenser circuit, and a controller. The inside condenser circuit includes a first inlet valve configured to receive a first portion of refrigerant out of a compressor, and a cabin condenser configured to receive the first portion of the refrigerant from the first inlet valve and condense the first portion of refrigerant while heating an interior of a cabin of the vehicle. The outside condenser circuit includes: a second inlet valve configured to receive a second portion of the refrigerant out of the compressor; an outside condenser configured to receive the second portion of the refrigerant from the second inlet valve and compress the second portion of the refrigerant; a reservoir downstream from the cabin condenser and the outside condenser and configured to receive the first portion of the refrigerant and the second portion of the refrigerant; an outside subcool heat exchanger downstream from the reservoir; and a bypass valve connected in parallel with the outside subcool heat exchanger. The outside subcool heat exchanger and the bypass valve receive respective portions of the refrigerant from the reservoir. The control module is configured to control positions of the first inlet valve, the second inlet valve and the bypass valve.

In other features, an outside condenser circuit for a vehicle is provided. The outside condenser circuit includes: an outside condenser configured to receive a first portion of refrigerant in a refrigeration system from an outside condenser inlet valve; a reservoir configured to receive the first portion of the refrigerant from the outside condenser and a second portion of the refrigerant in the refrigeration system from a cabin condenser; an outside subcool heat exchanger configured to receive a third portion of the refrigerant from the reservoir and output the third portion of the refrigerant to one or more expansion valves; and a bypass valve, wherein a position of the bypass valve corresponds to (i) an amount of refrigerant output from the reservoir and bypasses the outside subcool heat exchanger, and (ii) an amount of cabin heating in the vehicle.

In other features, a method of operating a refrigeration system for a vehicle is provided. The method includes: detecting outputs of sensors; based on the outputs of the sensors, determining whether to heat a cabin of the vehicle, and determining an amount of cooling for a powertrain of the vehicle; and while heating the cabin, opening and adjusting a cabin condenser inlet valve based on the outputs of the sensors. The method further includes, while providing a first amount of cooling to the powertrain that is less than a predetermined amount, closing an outside condenser inlet valve of an outside condenser and adjusting a position of a bypass valve, wherein a position of the bypass valve corresponds to an amount of refrigerant bypassing an outside subcool heat exchanger and passing from a reservoir to the bypass valve. The outside subcool heat exchanger is downstream from the outside condenser. The method further includes, while providing a second amount of cooling to the powertrain that is greater than or equal to the predetermined amount, opening the outside condenser inlet valve and closing the bypass valve.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Heat pump systems exist that can precisely control heating capacity at both a cabin condenser and an outside condenser. These heat pump systems utilize two electric expansion valves, implement an accumulator cycle, include complicated control logics and have a higher than usual refrigerant charge amount. As a result, the heat pump systems are expensive. The accumulator cycle includes accumulating refrigerant in a reservoir between an evaporator and a compressor. The accumulator cycle exhibits poorer air-conditioning (A/C) performance in summer (or high temperature conditions) than a receiver cycle, which includes collecting refrigerant out of condensers in a reservoir rather than out of an evaporator.

The examples set forth herein include refrigeration systems (e.g., heat pump systems) operable to provide cabin heating while providing powertrain cooling. The examples precisely control the heating capacities of cabin and outside condensers in order to achieve both cabin comfort and requested powertrain cooling. Precise heating capacity control at both cabin condenser and outside condenser is provided especially during low ambient temperature conditions. Also, a receiver cycle is used, such that A/C performance during hot ambient temperature conditions is not sacrificed.

The disclosed examples also allow for refrigerant charge amounts that are less than prior refrigeration system techniques. This is because the provided examples do not include use of an outside condenser during cold operating conditions. An outside condenser may be much larger than a cabin condenser and thus hold more refrigerant. An amount of refrigerant that a refrigeration system is charged with is typically based on a worst case scenario. A worst case scenario may occur during cold operating conditions when powertrain cooling is requested and a maximum heat output rate of a cabin condenser is also requested. Thus, if the outside condenser is not needed during cold operating conditions, the refrigeration system may be charged with a smaller amount of refrigerant.

The examples include unique refrigeration system designs that achieve the above-stated precise control of cabin heating, removal of excess heat via an outside subcool heat exchanger and/or outside condenser, and powertrain cooling. Multiple components may be integrated into an outside condenser and/or a corresponding condenser circuit.

The examples may be applied (but not limited) to electric vehicles and include two condensers; one is a cabin condenser that is used to provide heat to a cabin and the other is an outside condenser, which dissipates excessive heat to surroundings of a vehicle. The examples precisely control an amount of heat provided to a cabin to achieve human comfort while releasing extra amounts of heat to the surroundings via the outside condenser.

Figure 1:
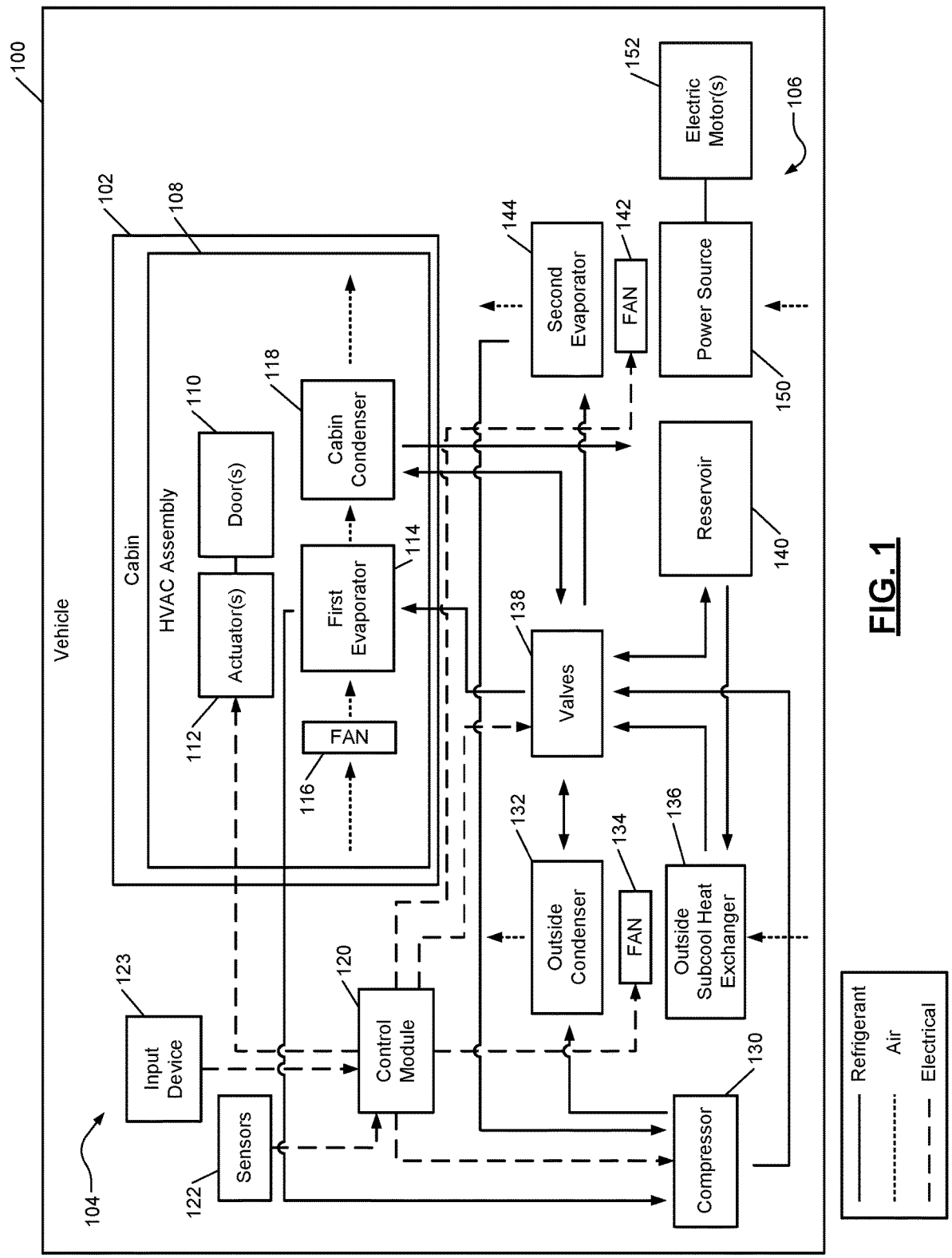
FIG. 1 is a functional block diagram of an example of a vehicle including a refrigeration system in accordance with an embodiment of the present disclosure.

FIG. 1 shows a vehicle 100 that includes a cabin 102, a refrigeration system 104, and a powertrain 106. A heating ventilation and air-conditioning (HVAC) assembly 108 may be disposed in the cabin 102. The HVAC assembly 108 may include one or more doors 110, which are actuated by actuators 112 (e.g., motors, air pumps, etc.), a first (or cabin) evaporator 114, a first fan 116, and a cabin condenser 118. The actuators 112 and first fan 116 are controlled by a control module 120 based on signals from sensors 122 and an input device 123. In one embodiment, one of the doors 110 is disposed between the fan and the first evaporator 114 and is used to control an amount of air passing through the first evaporator 114 and/or the cabin condenser 118. In another embodiment, one of the doors 110 is disposed between the first evaporator 114 and the cabin condenser 118 and is used to adjust an amount of air passing from the first evaporator 114 to the cabin condenser 118.

The sensors 122 may include: temperature sensors, such as ambient temperature sensors, cabin temperature sensors, refrigeration system refrigerant temperature sensors, air temperature sensors, power source temperature sensors, etc.; and other sensors, such as a humidity sensor. The input device 123 may be a display, a key pad, a dial, a switch, and/or other input device. As an example, the input device 123 may be used to manually request dehumidification of the cabin 102. The sensors 122 may be disposed internal to or external to the cabin 102.

The refrigeration system 104 includes the elements 110, 112, 114, 116, 118, 120 and may also include a compressor 130, an outside condenser 132, a second fan 134, an outside subcool heat exchanger 136, valves 138 (e.g., condenser inlet valve, outside condenser inlet valve, check valves, a bypass valve, expansion valves, etc.), a reservoir 140 (e.g., a receiver bottle), a third fan 142, and a second evaporator 144. The first evaporator 114 is used to dehumidify the cabin 102. The cabin condenser 118 is located inside the HVAC assembly 108, may replace a regular heater core, and is used to heat the cabin 102. The outside condenser 132 and outside subcool heat exchanger 136 are used to remove excess heat from a refrigerant circulating between the elements of the refrigeration system 104. The cabin condenser 118 and the outside subcool heat exchanger 136 may be smaller than the outside condenser 132. An air flow rate through the cabin condenser 118 may be less than air flow rates through the outside condenser 132 and the outside subcool heat exchanger 136.

The powertrain 106 may include a power source 150 and one or more electric motors 152. The power source 150 may include batteries, one or more battery packs, a hybrid engine, an internal combustion engine, etc. The second evaporator 144 is used to cool the power source 150. Cooling of the power source 150 may be based on detected temperatures of the power source 150 as detected by one or more of the sensors 122.

The first fan 116 may transfer air through the first evaporator 114 and the cabin condenser 118. The second fan 134 may transfer air through the outside subcool heat exchanger 136 and the outside condenser 132. The third fan 142 may transfer air across the power source 150 and through the second evaporator 144. The fans 132, 142, the compressor 130 and the positions of the valves 138 may also be controlled by the control module 120 based on signals from the sensors 122 and the input device 123.

Although the third fan 142 and the second evaporator 144 are shown as air cooling the power source 150 without the use of channels, the power source 150 may be air cooled and/or liquid cooled. As an example, the power source 150 may include channels through which air and/or liquid is circulated. The power source 150 may be located upstream or downstream from the evaporator 144. The refrigerant passing through the second evaporator 144 may pass through the power source 150. A pump may circulate the refrigerant passing through the power source 150.

Operation of the refrigeration system 104 is further described below with respect to the embodiments of FIGS. 2-6.

Figure 2:
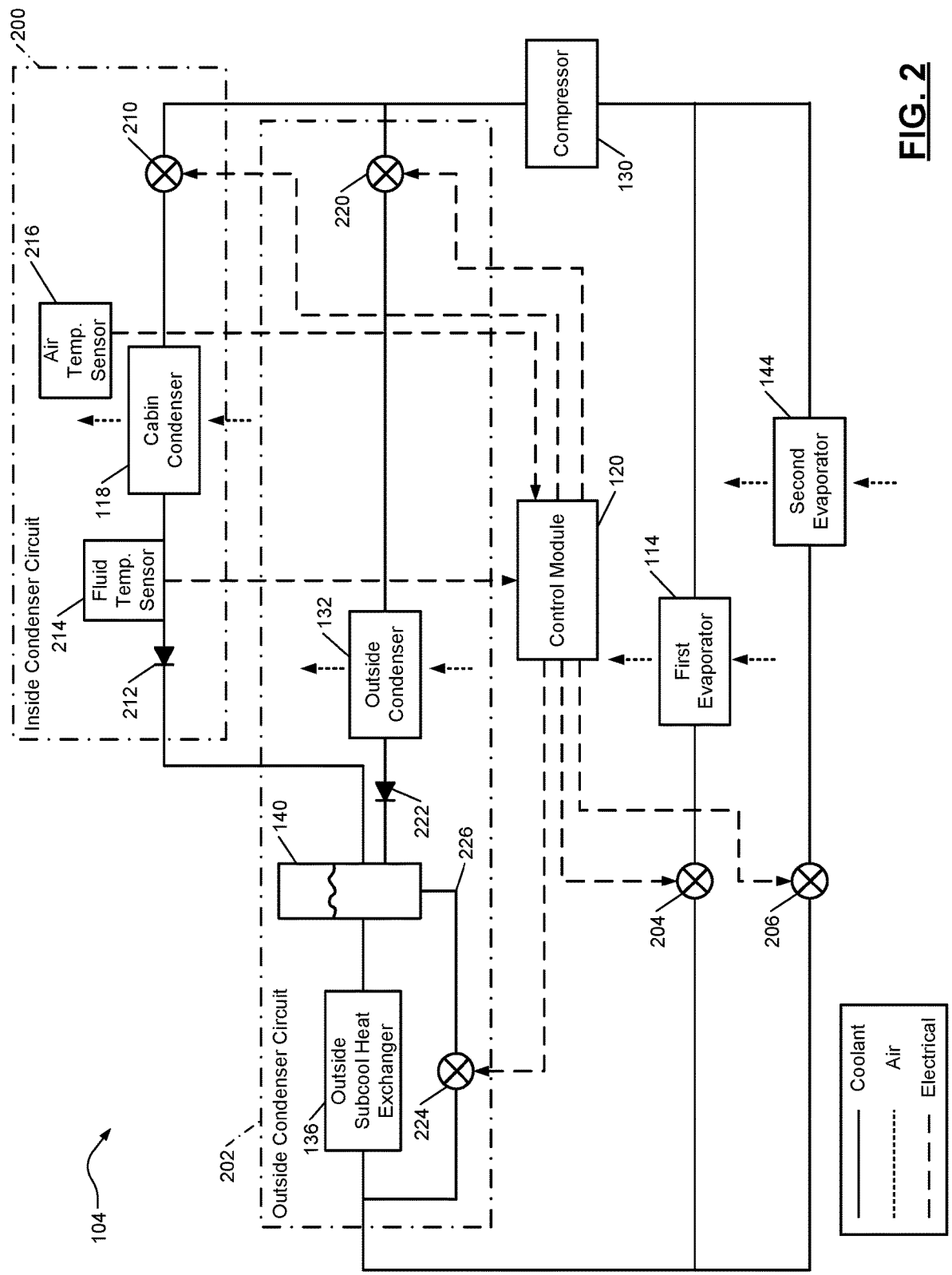
FIG. 2 is a functional block diagram of an example of the refrigeration system of FIG. 1.

FIG. 2 shows at least a portion of the refrigeration system 104 of FIG. 1. The refrigeration system 104 includes an inside condenser circuit 200, an outside condenser circuit 202, the control module 120, expansion valves 204, 206, the evaporators 114, 144 and the compressor 130.

The inside condenser circuit 200 may include a cabin condenser inlet valve 210, the cabin condenser 118, a first check valve 212, a fluid temperature sensor 214 and/or an air temperature sensor 216. The cabin condenser inlet valve 210 is used to adjust an amount and/or flow rate of refrigerant passing through the cabin condenser 118. The first check valve 212 prevents refrigerant from backing up to the cabin condenser 118 after passing through the first check valve 212. The fluid temperature sensor 214 detects a temperature of refrigerant out of the cabin condenser 118. The air temperature sensor 216 detects a temperature of air out of the cabin condenser 118.

The outside condenser circuit 202 may include an outside condenser inlet valve 220, the outside condenser 132, a second check valve 222, the reservoir 140, the outside subcool heat exchanger 136 and/or a bypass valve 224. The outside condenser inlet valve 220 is used to adjust an amount and/or flow rate of refrigerant passing through the outside condenser 132. The second check valve 222 prevents refrigerant from backing up to the outside condenser 132 after passing through the second check valve 222. Refrigerant out of the check valves 212, 222 is provided to the reservoir 140. The outside condenser inlet valve 220, the outside condenser 132, and the second check valve 222 are connected in parallel with the inside condenser inlet valve 210, the cabin condenser 118 and the first check valve 212. Refrigerant out of the reservoir 140 is provided to the outside subcool heat exchanger 136 and the bypass valve 224.

The bypass valve 224 is disposed along a bypass channel 226. The bypass valve 224 and the bypass channel 226 are connected in parallel with the outside subcool heat exchanger 136. The bypass valve 224 is used to adjust an amount and/or flow rate of refrigerant through the outside subcool heat exchanger 136 and also to adjust the amount of heat output of the cabin condenser. In one embodiment, cooling provided by the second evaporator 144 is based on power output and temperatures of the power source 150 of FIG. 1. Power supplied to the compressor 130 of FIG. 1 is dependent on the rate of heat absorbed by the first evaporator 114 and the second evaporator 144. As a result, the rate of heat output by the cabin condenser 118 is based on a position of the bypass valve 224, which adjusts a rate of heat output of the outside subcool heat exchanger 136. The position of the bypass valve 224 may be adjusted to satisfy one or more targeted temperatures (e.g., a temperature of refrigerant out of the cabin condenser 118, a temperature of air out of the cabin condenser 118, a temperature in the cabin 102 of FIG. 1, etc.

The bypass valve 224 may be controlled by the control module 120 based on signals from sensors (e.g., one or more of the sensors 122 of FIG. 1 and/or the sensors 214, 216).

The valves 204, 206, 210, 220, 224 may be shut off valves, variable position valves, linear control valves, and/or other suitable types of valves and may be controlled by the control module 120 based on signals from sensors (e.g., one or more of the sensors 122 of FIG. 1 and/or the sensors 214, 216) and may be controlled based on the output of the input device 123 of FIG. 1. In one embodiment, the valves 204, 206, 210, 220, 224 are continuous variable position valves and the valves 204, 206, 220 are magnetic ON/OFF valves. The valves 204, 206 are used to control amounts and/or flow rates of refrigerant passing through the evaporators 114, 144. Refrigerant out of the evaporators 114, 144 is provided to the compressor 130 of FIG. 1.

Operating Modes

The control module 120 may operate in multiple different modes, such as (i) a cabin heating and low to medium power source cooling mode (referred to herein as the "first operating mode"), (ii) a cabin heating, dehumidification and low to medium power source cooling mode (referred to herein as the "second operating mode"), (iii) a cabin heating, dehumidification and high power source cooling mode (referred to herein as the "third operating mode"), (iv) a cabin heating and high power source cooling mode (referred to herein as the "fourth operating mode"), and (v) a cabin cooling and power source cooling mode (referred to as the "fifth operating mode").

While in the first operating mode, the outside condenser inlet valve 220 is closed and the cabin condenser inlet valve 210 is fully open. Liquid refrigerant flows out of the cabin condenser 118 and into the reservoir 140. The refrigerant flows out of the reservoir 140 and to either the outside subcool heat exchanger 136 or to the bypass channel 226 and through the bypass valve 224. A ratio of and amount of refrigerant out of the reservoir 140 to the outside subcool heat exchanger 136 relative to an amount of refrigerant out of the reservoir 140 to the bypass valve 224 is controlled by the control module 120. The control module 120 adjusts this ratio by adjusting a position of the valve 224. The higher the ratio (i.e. the more the bypass valve 224 is closed), the more refrigerant flows through the outside subcool heat exchanger 136 and the more heat is transferred from the refrigerant and out of the subcool outside heat exchanger 136. This reduces the heat output (or heating power) of the cabin condenser 118. On the other hand, the more the bypass valve 224 is open, the less refrigerant flow through the outside subcool heat exchanger 136 and the less heat output at the outside subcool heat exchanger 136. This increases the heating power of the cabin condenser 118. The refrigerant flows from the outside subcool heat exchanger 136 and/or the bypass valve 224 to the expansion valves 204, 206.

During the first operating mode, the first expansion valve 204 is closed and the second expansion valve 206 is open. This allows the refrigerant to flow through the second evaporator 144 to provide heat absorption and cool the power source 150 of FIG. 1.

By closing the outside condenser inlet valve 220 and controlling flow of refrigerant through the outside subcool heat exchanger 136, an appropriate level of heating power is provided at the cabin condenser 118. This heating power would not be provided if instead the outside condenser inlet valve 220 were open, in which case there would not be enough heating power at the cabin condenser 118. This is because the outside condenser 132 would release too much heat to the surrounding environment.

While in the second operating mode, the outside condenser inlet valve 220 is closed, the cabin condenser inlet valve 210 is fully open and the ratio is controlled by the control module 120. The second operating mode is similar to the first operating mode, except the first expansion valve 204 is open allowing refrigerant to flow through the first evaporator 114. This provides dehumidification of the cabin 102 of FIG. 1.

While in the third operating mode, the outside condenser inlet valve 220 is open and the position of the cabin condenser inlet valve 210 is controlled by the control module 120. The control module 120 may target a subcool temperature at the outlet of the cabin condenser 118 and/or or a heat absorption rate (e.g., 5 Kilo-watts) and adjust the position of the cabin condenser inlet valve 210 to provide the target subcool temperature and/or amount of heat absorption. The subcool temperature refers to a temperature below a normal boiling point of the refrigerant. The temperature at the outlet of the cabin condenser 118 may refer to the temperature of the refrigerant out of the cabin condenser 118, which is detected by the fluid temperature sensor 214. Thus, the position of the cabin condenser inlet valve 210 may be adjusted based on the target subcool temperature and the temperature detected by the fluid temperature sensor 214. The control module 120 may also adjust a position of one or more of the doors 110 to regulate an air flow rate at the cabin condenser 118 to control heating power of the cabin condenser 118.

The control module 120 may control the position of the cabin condenser inlet valve 210 based on an air outlet temperature detected by the air temperature sensor 216. The control module 120 may target a set temperature for the air out of the cabin condenser 118 and based on the air outlet temperature detected by the air temperature sensor 216 adjust the position of the cabin condenser inlet valve 210. The more open the cabin condenser inlet valve 210 is, the higher the air outlet temperature. In one embodiment, when the air outlet temperature is adjusted in this manner, one or more of the HVAC doors 110 are not included in the HVAC assembly 108 and/or are held in a fully open state.

The control module 120 may control a position of one or more of the doors 110 via the actuators 112 and operation of the fan 116 to regulate an air flow rate through or across the cabin condenser 118. This may also be based on the temperature detected by the fluid temperature sensor 214 and/or an air temperature detected by the air temperature sensor 216.

While in the third operating mode, refrigerant out of the cabin condenser 118 and the outside condenser 132 flows into the reservoir 140. The refrigerant out of the reservoir 140 flows through the outside subcool heat exchanger 136 and not through the bypass valve 224, as the bypass valve 224 is closed. The refrigerant then flows from the outside subcool heat exchanger 136 to the expansion valves 204, 206, which are open. Since both of the expansion valves 204, 206 are open, the refrigerant flows through both the first evaporator 114 and the second evaporator 144. This provides dehumidification of the cabin 102 and cooling of the power source 150 of FIG. 1.

While in the fourth operating mode, the outside condenser inlet valve 220 is open and the position of the cabin condenser inlet valve 210 is controlled by the control module 120. The bypass valve 224 is in a closed state. The fourth operating mode is similar to the third operating mode, except the first expansion valve 204 is closed and there is not flow of refrigerant through the first evaporator 114. Dehumidification of the cabin 102 of FIG. 1 is not provided during the fourth operating mode.

While in the fourth operating mode, the control module 120 may target a cabin condenser outlet subcool temperature and adjust a position of one or more of the doors 110 to regulate an air flow rate at the cabin condenser 118 to control heating power of the cabin condenser 118. In another embodiment, the control module 120 targets a cabin condenser air output temperature and does not adjust position of one of the doors 110. In this embodiment, the one or more doors 110 may not be included and/or left in an open state.

Although FIGS. 1-2 show inclusion of two evaporators connected in parallel, any number of evaporators may be included and may be connected in different arrangements. For example, the first evaporator 114 or the second evaporator 144 may not be included. As another example, a third evaporator may be included to provide cooling of other vehicle components. A third expansion valve may be included for the third evaporator or the third evaporator may be connected downstream from the second expansion valve 206 and in parallel or series with the second evaporator 144.

Operation of the control module 120 and the elements of the refrigeration system 104 in the stated modes are further described below with respect to the method of FIG. 6.

Figure 3:
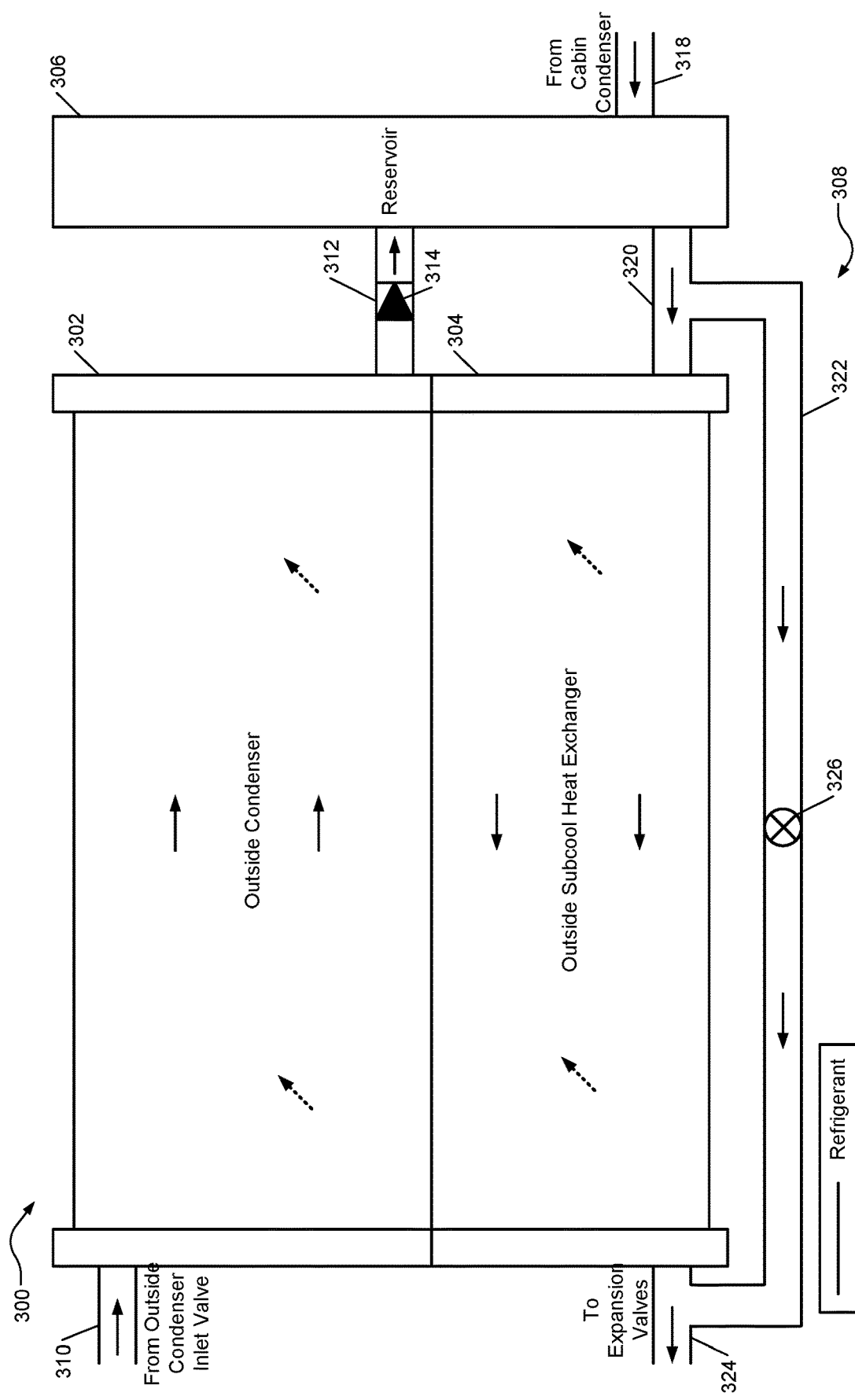
FIG. 3 is a functional block diagram of an outside condenser circuit including a bypass circuit across an outside subcool heat exchanger in accordance with an embodiment of the present disclosure.

FIG. 3 shows an outside condenser circuit 300 that includes an outside condenser 302, an outside subcool heat exchanger 304, a reservoir 306, and a bypass circuit 308 connected across the outside subcool heat exchanger 304. The outside condenser circuit 300 may replace a portion of the outside condenser circuit 202 of FIG. 2. The outside condenser 302 receives a refrigerant from the outside condenser inlet valve 220 via a first channel 310 and supplies the refrigerant to the reservoir 306 via a second channel 312. The second channel 312 includes a check valve 314 that prevents refrigerant from backing up into the outside condenser 302.

The reservoir 306 receives refrigerant from the outside condenser 302 and from the cabin condenser 118 of FIG. 2 via a third channel 318. The reservoir 306 outputs refrigerant to the outside subcool heat exchanger 304 via a fourth channel 320. The bypass circuit 308 includes a bypass channel 322 that extends from the fourth channel 320 to a fifth channel 324 at an output of the outside subcool heat exchanger 304. The bypass circuit 308 further includes a bypass valve 326. The bypass valve 326 allows refrigerant to bypass the outside subcool heat exchanger 304 and is controlled by the control module 120 of FIG. 2. The bypass valve 326 may be controlled similarly as the bypass valve 224 of FIG. 2. The fifth channel 324 supplies refrigerant from the outside subcool heat exchanger 304 and the bypass channel 322 to the expansion valves 204, 206 of FIG. 2.

The outside subcool heat exchanger 304 may be integrated with the outside condenser 302, such that the outside subcool heat exchanger 304 abuts the outside condenser 302 as shown and/or is integrally formed with the outside condenser 302 as a single device. As shown, air may flow through the outside subcool heat exchanger 304 and the outside condenser 302. The outside subcool heat exchanger 304 may be smaller than the outside condenser 302. In one embodiment, the outside subcool heat exchanger 304 is disposed in front of the outside condenser 302, such that (i) some air flows through the outside subcool heat exchanger 304 and through the outside condenser 302, and (ii) other air flows through the outside condenser 302 without first passing through the outside subcool heat exchanger 304.

Figure 4:
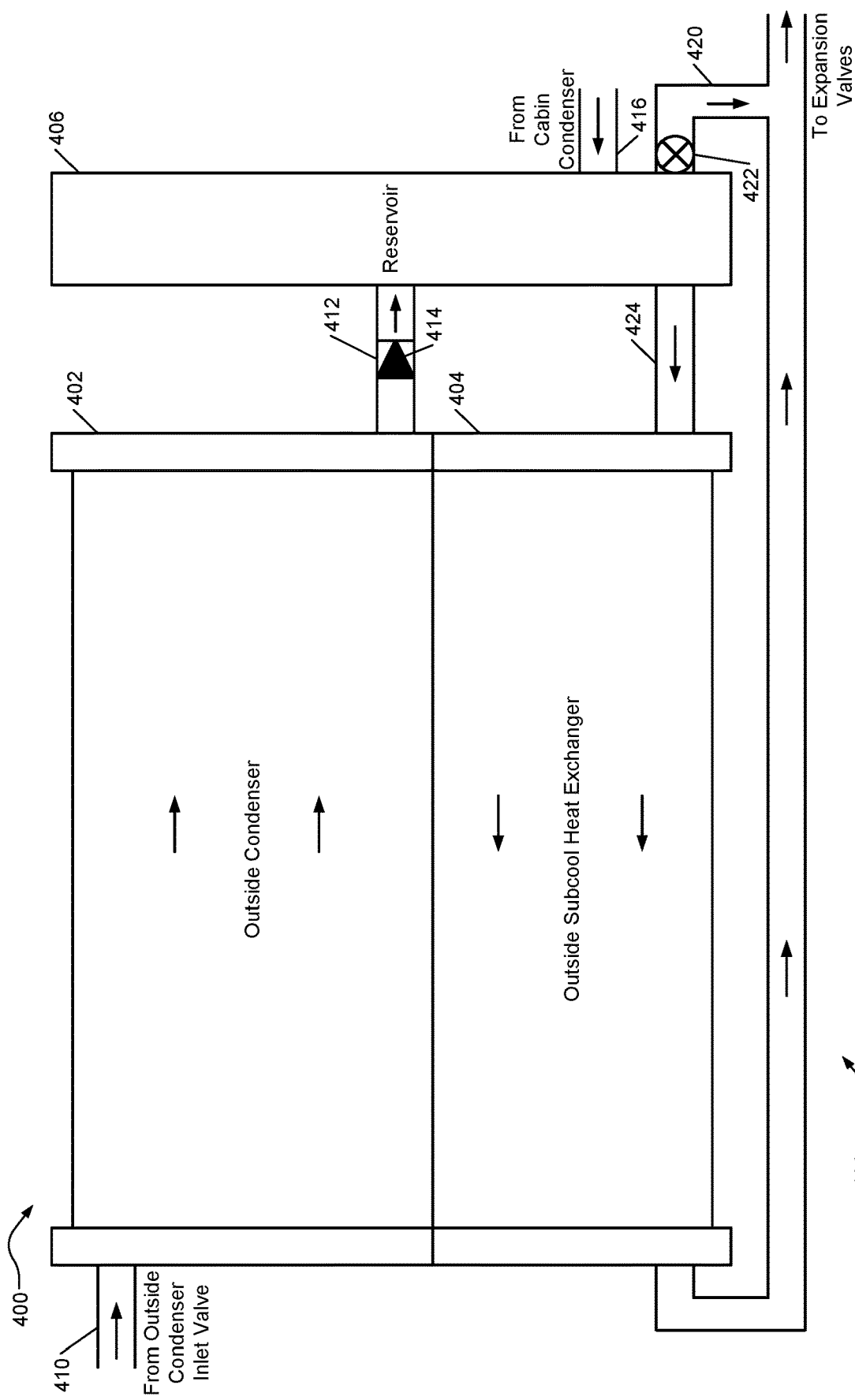
FIG. 4 is a functional block diagram of an outside condenser circuit including a bypass circuit across an outside subcool heat exchanger and a reservoir in accordance with an embodiment of the present disclosure.

FIG. 4 shows an outside condenser circuit 400 that includes an outside condenser 402, an outside subcool heat exchanger 404, a reservoir 406, and a bypass circuit 408. The outside condenser circuit 400 may replace a portion of the outside condenser circuit 202 of FIG. 2. The outside condenser 402 receives refrigerant from the outside condenser inlet valve 220 via a first channel 410 and provides the refrigerant to the reservoir 406 via a second channel 412, which includes a check valve 414. The reservoir 406 receives the refrigerant from the outside condenser 402 via the second channel 412 and the cabin condenser 118 via a third channel 416. The reservoir 406 also receives refrigerant from the outside subcool heat exchanger 404 via the bypass circuit 408.

The bypass circuit 408 includes a bypass channel 420 and a bypass valve 422. The bypass valve 422 allows refrigerant to bypass the outside subcool heat exchanger 404. The bypass valve 422 may be controlled by the control module 120 of FIG. 2 and similarly as the bypass valve 224 of FIG. 2. The bypass channel 420 extends from an outlet of the outside subcool heat exchanger 404 to an outlet of the reservoir 406. The bypass channel 420 also provides refrigerant to the expansion valves 204, 206 of FIG. 2. The reservoir 406 outputs refrigerant via a fourth channel 424 to the outside subcool heat exchanger 404.

The outside subcool heat exchanger 404 may be integrated with the outside condenser 402, such that the outside subcool heat exchanger 404 abuts the outside condenser 402 as shown and/or is integrally formed with the outside condenser 402 as a single device. As shown, air may flow through the outside subcool heat exchanger 404 and the outside condenser 402. The outside subcool heat exchanger 404 may be smaller than the outside condenser 402. In one embodiment, the outside subcool heat exchanger 404 is disposed in front of the outside condenser 402, such that (i) some air flows through the outside subcool heat exchanger 404 and through the outside condenser 402, and (ii) other air flows through the outside condenser 402 without first passing through the outside subcool heat exchanger 404.

Figure 5:
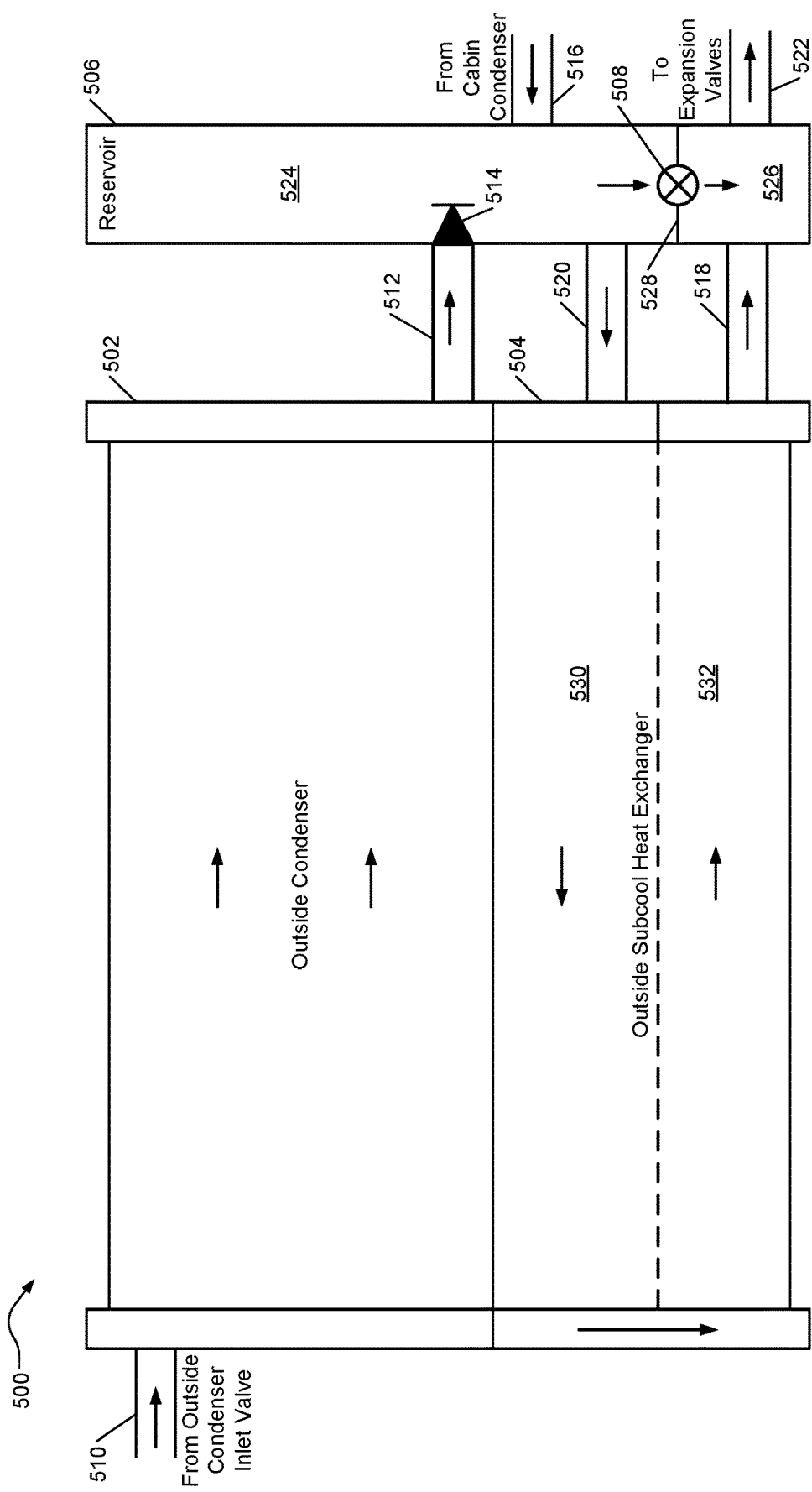
FIG. 5 is a functional block diagram of an outside condenser circuit including a bypass valve incorporated in a reservoir in accordance with an embodiment of the present disclosure.

FIG. 5 shows an outside condenser circuit 500 that includes an outside condenser 502, an outside subcool heat exchanger 504, and a reservoir 506 with a bypass valve 508 incorporated in the reservoir 506. The outside condenser circuit 500 may replace a portion of the outside condenser circuit 202 of FIG. 2. The outside condenser 502 receives refrigerant from the outside condenser inlet valve 220 via a first channel 510 and outputs the refrigerant to the reservoir 506 via a second channel 512. A check valve 514 may be connected to an end of the second channel 512 and be incorporated in the reservoir 506.

The reservoir 506 receives refrigerant from the second channel 512, the cabin condenser 118 of FIG. 2 via a third channel 516, and the outside subcool heat exchanger 504 via a fourth channel 518. The reservoir 506 outputs refrigerant to the outside subcool heat exchanger 504 via a fifth channel 520 and to the expansion valves 204, 206 of FIG. 2 via a sixth channel 522. The reservoir 506 is divided into a first portion 524 and a second portion 526 by a dividing member (e.g., a plate) 528. The bypass valve 508 allows refrigerant to bypass the outside subcool heat exchanger 504.

The bypass valve 508 is controlled by the control module 120 of FIG. 2 and allows refrigerant to pass from the first portion 524 to the second portion 526. The bypass valve 528 may be controlled similarly as the bypass valve 224 of FIG. 2.

The outside subcool heat exchanger 504 includes a first half 530 and a second half 532. Refrigerant flows: from the channel 520 at a first end of the outside subcool heat exchanger 504 into the first portion 530; through the first portion 530 to a second end of the outside subcool heat exchanger 504 and to the second portion 532 at the second end; and through the second portion 532 to the channel 518.

The outside subcool heat exchanger 504 may be integrated with the outside condenser 502, such that the outside subcool heat exchanger 504 abuts the outside condenser 502 as shown and/or is integrally formed with the outside condenser 502 as a single device. As shown, air may flow through the outside subcool heat exchanger 504 and the outside condenser 502. The outside subcool heat exchanger 504 may be smaller than the outside condenser 502. In one embodiment, the outside subcool heat exchanger 504 is disposed in front of the outside condenser 502, such that (i) some air flows through the outside subcool heat exchanger 504 and through the outside condenser 502, and (ii) other air flows through the outside condenser 502 without first passing through the outside subcool heat exchanger 504.

In an embodiment, the reservoir 506 is formed integrally with the outside condenser 502 and the outside subcool heat exchanger 504 as a single unitary device. This may include removal of the channels 512, 520 and 518. The reservoir 506 may abut the outside condenser 502 and the outside subcool heat exchanger 504.

Figure 6:
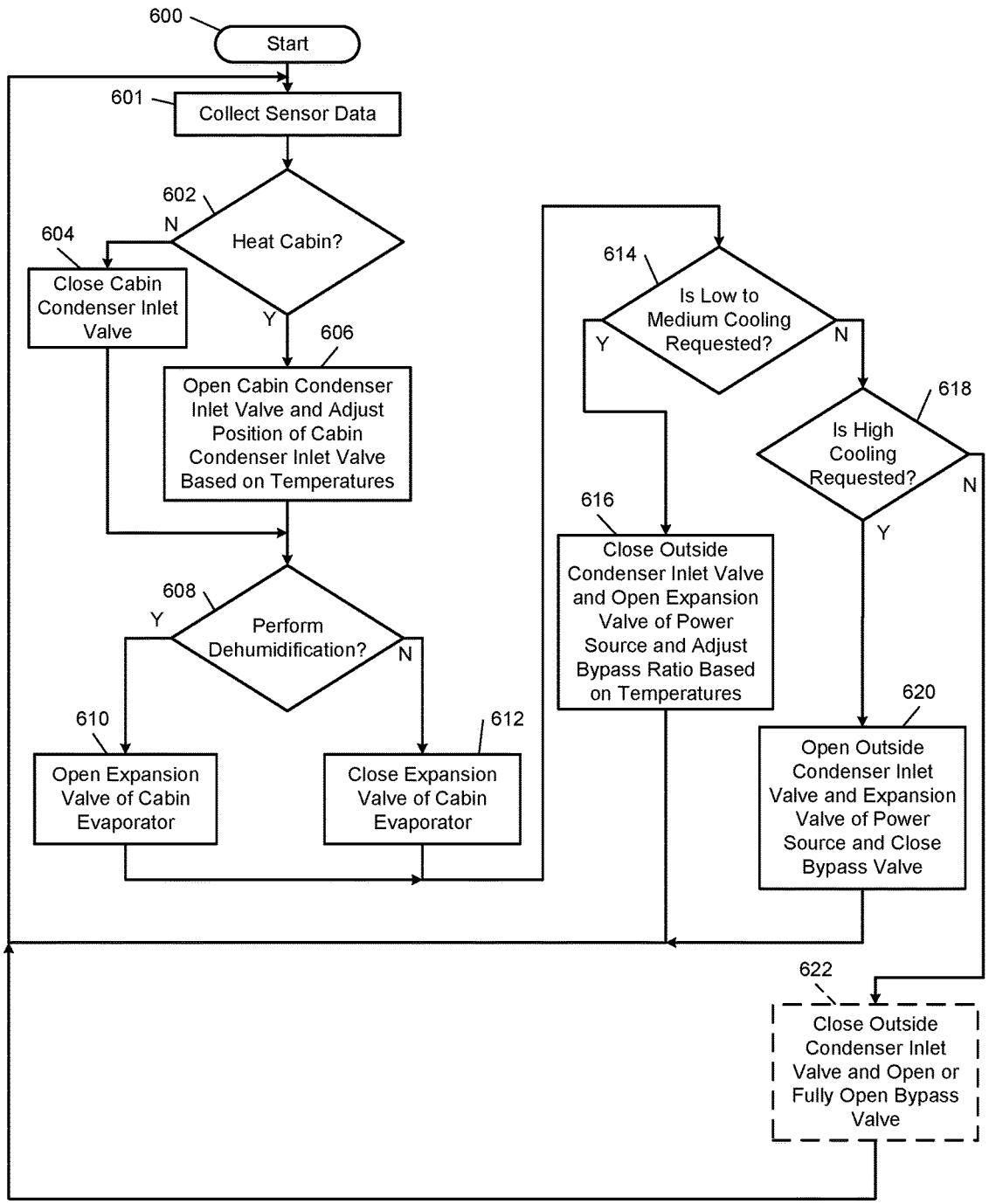
FIG. 6 illustrates a method of operating the refrigeration system of FIG. 2 in accordance with an embodiment of the present disclosure.

The systems disclosed herein may be operated using numerous methods, an example method is illustrated in FIG. 6. In FIG. 6, a method of operating a refrigeration system is shown. Although the following operations are primarily described with respect to the implementations of FIGS. 1-2, the operations may be easily modified to apply to other implementations of the present disclosure, such as the implementations of FIGS. 3-5. The operations may be iteratively performed. Operations 606, 612, 616 may be associated with the first operating mode. Operations 606, 610, 616 may be associated with the second operating mode. Operations 606, 610, and 620 may be associated with the third operating mode. Operations 606, 612, and 620 may be associated with the fourth operating mode. Operation 604 along with one of operations 616 and 620 is associated with the fifth operating mode. Either of operations 610 and 612 may be performed while in the fifth operating mode.

The method may begin at 600. At 602, sensor data may be collected by the control module 120. The sensor data may be from the sensors 122, 214, 216 and/or other sensors. At 602, the control module 120 whether cabin heating is requested. This may include determining whether one or more temperatures in the cabin 102 are less than set and/or predetermined temperatures. The temperatures may include a temperature of refrigerant out of the cabin condenser 118, a temperature of air out of the cabin condenser 118, a temperature within the cabin, etc. If cabin heating is requested and/or called for, operation 606 is performed, otherwise operation 604 may be performed.

At 604, the cabin condenser inlet valve 210 is closed. At 606, the cabin condenser inlet valve 210 is opened and the control module 120 may adjust position of the cabin condenser inlet valve 210 based on one or more of the stated detected temperatures and corresponding set and/or predetermined temperatures.

At 608, the control module 120 may determine whether to perform dehumidification of the cabin 102. This may include comparing an output of a humidity sensor to a predetermined humidity level and/or range and if the output of the humidity sensor is greater than the predetermined humidity level and/or outside the humidity range, then performing dehumidification. As an alternative, the control module 120 may monitor output of the input device 123 and if the output indicates a request for dehumidification, then perform dehumidification. If dehumidification is to be performed, operation 610 may be performed, otherwise operation 612 may be performed. At 610, the first expansion valve 204 is opened. At 612, the first expansion valve 204 is closed.

At 614, the control module 120 determines whether low to medium cooling is requested, such as low to medium powertrain cooling (or low to medium heat absorption). Low to medium cooling may refer to a first amount (or rate) of cooling that is less than a first predetermined amount (or rate). If low to medium cooling is requested, operation 616 may be performed, otherwise operation 618 may be performed. For example, if the powertrain is outputting an amount of power that is less than a predetermined power level and/or temperatures of the power source 150 are greater than a first predetermined temperature and less than a second predetermined temperature (i.e. within a predetermined range), then operation 616 may be performed, otherwise operation may be 618 may be performed.

At 616, the control module 120 closes the outside condenser inlet valve 220, opens the second expansion valve 206 and adjusts the bypass ratio by controlling a position of a bypass valve (e.g., the bypass valve 224). The position of the bypass valve may be adjusted based on the detected temperatures and the corresponding set and predetermined temperatures.

At 618, the control module 120 the control module 120 determines a whether high cooling (or high heat absorption) is requested, such as high powertrain cooling. High cooling may refer to a second amount (or rate) of cooling greater than or equal to the first predetermined amount (or rate) of cooling. If high cooling is requested, operation 620 may be performed, otherwise operation 622 may be performed. For example, if the powertrain is outputting an amount of power that is greater than the predetermined power level and/or temperatures of the power source 150 are greater than a the second predetermined temperature, then operation 620 may be performed, otherwise operation may be 622 may be performed as showed or operation 616 may be performed. At 620, the control module 120 opens the outside condenser inlet valve 220 and the second expansion valve 206 and closes the bypass valve.

Operations 618 and 620 may be performed while operation 606 is performed and/or while one of operations 610 and 612 are performed. Operations 618 and 620 may be performed while operation 606 is performed, for example, during winter and/or cold temperature conditions. When both cabin cooling and powertrain cooling are provided operations 604 may be performed while operation 616 or operation 620 are performed.

At 622, the control module 120 may close the outside condenser inlet valve 220 and open (or fully open) the bypass valve 224. In one embodiment, the control module 120 closes the second expansion valve 206 and bypasses the second evaporator 144. Although not shown in FIG. 2, the refrigeration system 104 may include a bypass channel and a second bypass valve to bypass the second evaporator 144. The second bypass valve may be opened for operation 622. In another embodiment, operation 622 is not performed and operation 616 is performed instead of operation 622.

Operation 601 may be performed subsequent to operations 616, 620 and 622.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A refrigeration system for a vehicle, the refrigeration system comprising:
   an inside condenser circuit comprising
      a first inlet valve configured to receive a first portion of refrigerant out of a compressor, and
      a cabin condenser configured to receive the first portion of the refrigerant from the first inlet valve and condense the first portion of refrigerant while heating an interior of a cabin of the vehicle;
   an outside condenser circuit comprising
      a second inlet valve configured to receive a second portion of the refrigerant out of the compressor,
      an outside condenser configured to receive the second portion of the refrigerant from the second inlet valve and compress the second portion of the refrigerant,
      a reservoir downstream from the cabin condenser and the outside condenser and configured to receive the first portion of the refrigerant and the second portion of the refrigerant,
      an outside subcool heat exchanger downstream from the reservoir, and
      a bypass valve connected in parallel with the outside subcool heat exchanger,
      wherein the outside subcool heat exchanger and the bypass valve receive respective portions of the refrigerant from the reservoir; and
   a control module configured to control positions of the first inlet valve, the second inlet valve and the bypass valve.

2. The refrigeration system of claim 1, further comprising the compressor, wherein the first inlet valve and the second inlet valve are connected downstream from the compressor.

3. The refrigeration system of claim 1, further comprising:
   a first expansion valve connected downstream from the outside condenser circuit; and
   a first evaporator connected downstream from the first expansion valve,
   wherein the control module is configured to control a position of the first expansion valve.

4. The refrigeration system of claim 3, wherein the first evaporator is disposed in the cabin and configured to cool and dehumidify the interior of the cabin.

5. The refrigeration system of claim 4, wherein the control module is configured to, based on a signal from a dehumidification sensor or an input device, adjust a position of the first expansion valve.

6. The refrigeration system of claim 3, wherein:
   the first evaporator is configured to absorb heat in a power source of the vehicle; and
   the control module is control the positions of the first inlet valve, the second inlet valve, and the bypass valve and a position of the first expansion valve to provide cabin heating while providing powertrain cooling.

7. The refrigeration system of claim 3, further comprising:
   a second expansion valve; and a second evaporator downstream from the second expansion valve and configured to absorb heat from a powertrain of the vehicle,
wherein
the first evaporator is configured to dehumidify the interior of the cabin, and
the control module is configured to control a position of the second expansion valve.

8. The refrigeration system of claim 1, wherein the control module is configured to, based on at least one of a temperature of the first portion of the refrigerant out of the cabin condenser, a temperature of air out of the cabin condenser, or a temperature in the cabin, adjust a position of the bypass valve to adjust a heat output rate of the cabin condenser.

9. The refrigeration system of claim 1, wherein the control module is configured to (i) determine an amount of cooling for a powertrain of the vehicle, and (ii) based on the amount of cooling, determine whether to open the second inlet valve and whether to close the bypass valve.

\* \* \* \* \*